United States Patent
Wang et al.

(10) Patent No.: US 6,841,902 B2
(45) Date of Patent: Jan. 11, 2005

(54) METHOD AND APPARATUS FOR MINIMIZATION OF MAGNETIC BIAS FORCE HARMONICS IN A SPINDLE MOTOR

(75) Inventors: Jim-Po Wang, Pleasanton, CA (US); Michael Ray Tiller, Santa Cruz, CA (US)

(73) Assignee: Seagate Technology LLC, Scotts Valley, CA (US)

(*) Notice: Subject to any disclaimer, the term of this patent is extended or adjusted under 35 U.S.C. 154(b) by 0 days.

(21) Appl. No.: 10/348,634

(22) Filed: Jan. 21, 2003

(65) Prior Publication Data

US 2004/0066101 A1 Apr. 8, 2004

Related U.S. Application Data

(60) Provisional application No. 60/416,748, filed on Oct. 7, 2002.

(51) Int. Cl.$^7$ ............................................. H02K 11/00
(52) U.S. Cl. ................. 310/67 R; 310/90; 310/156.15; 310/156.83
(58) Field of Search ..................... 310/67 R, 85, 310/86, 90, 256, 156.12, 156.15, 156.23, 156.26, 156.28, 156.83, 156.03, 156.07, 156.62, 156.64, 156.74, 156.75, 156.76

(56) References Cited

U.S. PATENT DOCUMENTS

| | | | |
|---|---|---|---|
| 4,164,690 A | * 8/1979 | Muller et al. ............... 318/254 |
| 4,672,250 A | * 6/1987 | Seitz ............................ 310/90 |
| 4,922,162 A | * 5/1990 | Shiraki et al. ............... 310/268 |
| 4,985,792 A | * 1/1991 | Moir ........................ 360/99.08 |
| 4,998,033 A | * 3/1991 | Hisabe et al. ............. 310/67 R |
| 5,089,732 A | * 2/1992 | Konno et al. .............. 310/67 R |
| 5,142,173 A | 8/1992 | Konno et al. .............. 310/67 R |
| 5,223,758 A | * 6/1993 | Kataoka et al. ............... 310/90 |
| 5,291,357 A | * 3/1994 | Uda ........................ 360/99.08 |
| 5,426,548 A | * 6/1995 | Fujii et al. ............... 360/98.08 |
| 5,517,374 A | 5/1996 | Katakura et al. ......... 360/99.07 |
| 5,683,183 A | 11/1997 | Tanaka et al. .............. 384/100 |
| 5,744,882 A | 4/1998 | Teshima et al. .......... 310/67 R |
| 5,797,303 A | 8/1998 | Asada et al. ................. 82/1.11 |
| 6,034,454 A | 3/2000 | Ichiyama ..................... 310/90 |
| 6,205,110 B1 | 3/2001 | Miyamoto et al. .......... 369/266 |
| 6,211,592 B1 | 4/2001 | Ichiyama ..................... 310/90 |
| 6,271,612 B1 | * 8/2001 | Tanaka et al. ................ 310/90 |
| 6,339,270 B1 | 1/2002 | Ichiyama ................. 310/67 R |
| 6,364,532 B1 | 4/2002 | Ichiyama .................... 384/107 |
| 6,417,590 B1 | * 7/2002 | Komura et al. ............ 310/90.5 |
| 6,686,673 B1 | * 2/2004 | Komura et al. ............... 310/90 |

* cited by examiner

*Primary Examiner*—Dang Le
(74) *Attorney, Agent, or Firm*—Morrison & Foerster LLP

(57) ABSTRACT

A spindle motor is provided, which includes a stationary sleeve supported from a base, rotating shaft disposed through the sleeve, a fluid dynamic bearing between the sleeve and the shaft, a hub supported proximate a first end of the shaft, a stator supported from the base, a magnet supported from the hub and offset axially relative to the stator, and a steel ring supported from the base and positioned beneath the magnet.

16 Claims, 6 Drawing Sheets

* AC means the undesirable force harmonics

* AC means the undesirable force harmonics

METHOD AND APPARATUS FOR MINIMIZATION OF MAGNETIC BIAS FORCE HARMONICS IN A SPINDLE MOTOR

CROSS REFERENCE TO RELATED APPLICATIONS

This application claims priority to U.S. Provisional Patent Application Ser. No. 60/416,748, filed Oct. 7, 2002 by Jim-Po Wang and Michael R. Tiller (entitled "Minimization of Magnetic Bias Force Harmonics"), which is herein incorporated by reference.

FIELD OF THE INVENTION

The present invention generally relates to the field of fluid dynamic bearings motors, and more specifically relates to magnetically biased fluid dynamic bearing motors.

BACKGROUND OF THE INVENTION

Disk drive memory systems have been used in computers for many years for the storage of digital information. Information is recorded on concentric tracks of a magnetic disk medium, the actual information being stored in the form of magnetic transitions within the medium. The disks themselves are rotatably mounted on a spindle. Information is accessed by a read/write transducer located on a pivoting arm that moves radially over the surface of the rotating disk. The read/write head or transducer must be accurately aligned with the storage tracks on the disk to ensure proper reading and writing of information.

During operation, the disks are rotated at very high speeds within an enclosed housing using an electric motor generally located inside a hub or below the disks. Such spindle motors may have a spindle mounted by two ball bearing systems to a motor shaft disposed in the center of the hub. The bearing systems are spaced apart, with one located near the top of the spindle and the other spaced a distance away. These bearings support the spindle or hub about the shaft and allow for stable rotational relative movement between the shaft and the spindle or hub while maintaining accurate alignment of the spindle and shaft. The bearings themselves are normally lubricated by highly refined grease or oil.

The conventional ball bearing system described above is prone to several shortcomings. First, vibration generated by the balls rolling on the bearing raceways is a problem. This is one of the conditions that generally guarantees physical contact between raceways and balls, in spite of the lubrication provided by the bearing oil or grease. Bearing balls running on the microscopically uneven and rough raceways transmit the vibration induced by the rough surface structure to the rotating disk. This vibration results in misalignment between the data tracks and the read/write transducer, limiting the data track density and the overall performance of the disk drive system. Further, mechanical bearings are not always scalable to smaller dimensions. This is a significant drawback, since the tendency in the disk drive industry has been to shrink the physical dimensions of the disk drive unit.

As an alternative to conventional ball bearing spindle systems, much effort has been focused on developing a fluid dynamic bearing (FDB). In these types of systems, lubricating fluid, either gas or liquid, functions as the actual bearing surface between a shaft and a sleeve or hub. Liquid lubricants comprising oil, more complex fluids, or other lubricants have been utilized in such fluid dynamic bearings.

The reason for the popularity of the use of such fluids is the elimination of the vibrations caused by mechanical contact in a ball bearing system and the ability to scale the fluid dynamic bearing to smaller and smaller sizes. In designs such as the single plate FDB, two thrust surfaces generally are used to maintain the axial position of the spindle/motor shaft assembly. Such a configuration maintains axial position; however, this configuration does not aid in reducing the power required by the FDB at start up.

To control axial position of the spindle/motor shaft assembly while lowering power consumption, one of the thrust surfaces may be removed from the FDB and replaced with a magnetic force to constrain the motor's axial movement. This typically involves adding a magnetic circuit to the assembly consisting of a magnet fixed to the hub, sleeve or base that attracts (or repels) the facing motor hub, sleeve or base. The magnetic circuit may be accomplished either by the addition of a magnet of by offsetting the stator magnet relative to the stator. However, while effective, this bias force may induce undesirable harmonics that produce acoustic noise in the motor.

Thus, there is a need in the art for a magnetically biased fluid dynamic bearing motor that minimizes acoustic noise emanating from the motor.

SUMMARY OF THE INVENTION

A spindle motor comprising a stationary sleeve supported from a base, a rotating shaft disposed through the sleeve, a fluid dynamic bearing between the sleeve and the shaft, a hub supported proximate a first end of the shaft, a stator supported from the base, a magnet supported from the hub and offset axially relative to the stator, and a ring supported from the base and positioned beneath the magnet.

BRIEF DESCRIPTION OF THE DRAWINGS

So that the manner in which the above recited embodiments of the invention are attained and can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures.

DETAILED DESCRIPTION

Figure 1:
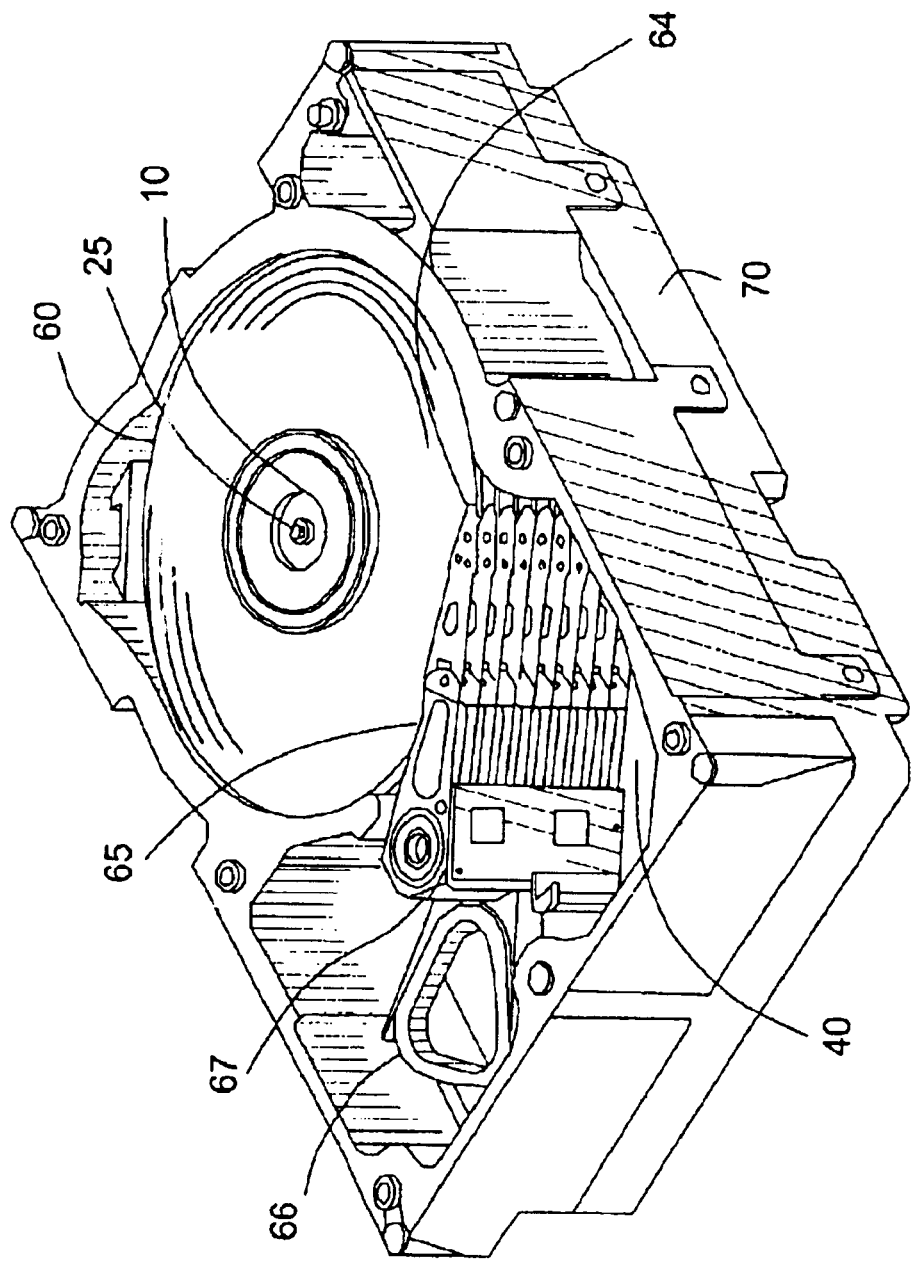
FIG. 1 illustrates an example of a magnetic disk drive for use with embodiments of the invention.

FIG. 1 illustrates an example of a magnetic disk drive in which embodiments of the invention may be employed. At least one magnetic disk 60 having a plurality of concentric tracks for recording information is mounted on a spindle 10. The spindle is mounted on spindle support shaft 25 for rotation about a central axis. As the disks are rotated by the motor, a transducer 64 mounted on the end of an actuator 65 is selectively positioned by a voice coil motor 66 rotating about a pivot axis 67 to move the transducer 64 from track to track across the surface of the disk 60. The elements of the disk drive are mounted on base 40 in a housing 70 that is typically sealed to prevent contamination (a top or cover of housing 70 is not shown). The disks 60 are mounted on spindle 10.

Figure 2:
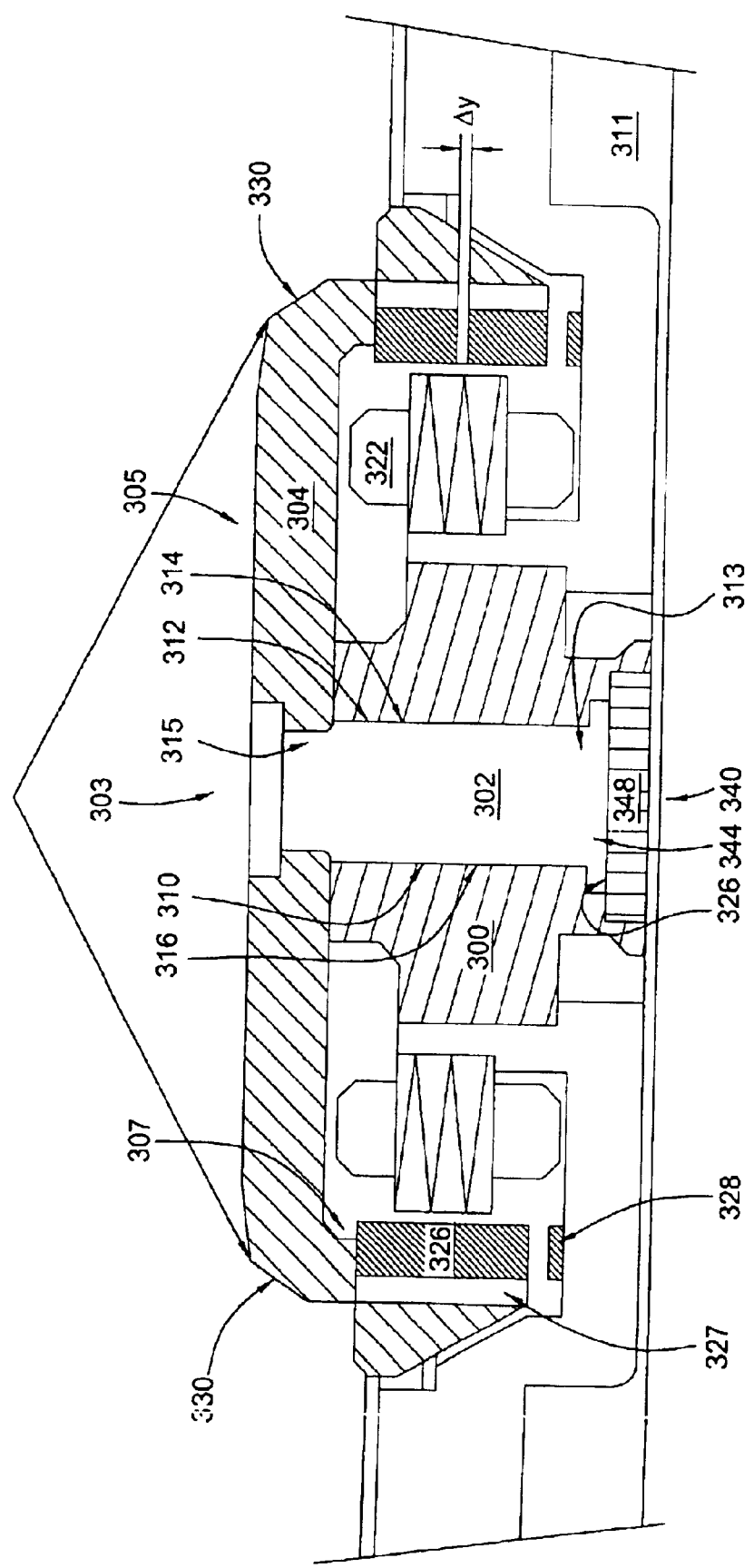
FIG. 2 is a vertical sectional view of one embodiment of a fluid dynamic bearing motor according to the invention.

FIG. 2 illustrates a magnetically biased fluid dynamic bearing motor 301 comprising a rotating assembly 305, a stationary assembly 303, and a fluid dynamic bearing 310. The rotating assembly 305 comprises a shaft 302 that supports a hub 304 at a first end 315 (the hub may be, for example, screwed to the shaft). A counter plate 348 is supported (for example by press fitting) on a second end 313 of the shaft 302. A magnet 326 is affixed to a back iron 327 mounted on an inner surface 307 of the hub 304. The hub 304 supports one or more disks (not shown).

The stationary assembly 303 comprises an annular sleeve 300 that is mounted to a base 311 and through which the shaft 302 is disposed. The stationary assembly further comprises a stator 322 and a ring 328 comprising a magnetically permeable material (such as steel), both mounted to the base 311. When the shaft 302 is disposed through the sleeve 300, the ring 328 rests below the magnet 326 in the hub 304, which is separated from the stator 322 by a gap. The stator 322, when energized, cooperates with the magnet 326 to induce rotation of the hub 304 about the shaft 302.

The fluid dynamic bearing 310 comprises a gap between the outer surface 312 of shaft 302 and the inner surface 314 of sleeve 300. At least one of those two surfaces 312, 314 has grooves to maintain the pressure of a fluid 316 (such as air, oil, or water) contained in the gap to support the relative rotation of the shaft 302 and sleeve 300.

In addition, the fluid dynamic bearing 310 comprises a gap between the bottom surface 344 of the shaft 302, and the top surface 346 of counter plate 348. At least one of the surfaces 344, 346 has grooves to maintain pressure of fluid 316 in the gap.

A problem associated with the above motor configuration is that the directional spinning of the shaft 302 with the fluid dynamic bearing 310 imposes an upward directional force 340 that can misalign the motor assembly. A magnetic bias force circuit created by offsetting the positions of the stator 322 and magnet 326 can prevent such misalignment.

Figure 3:
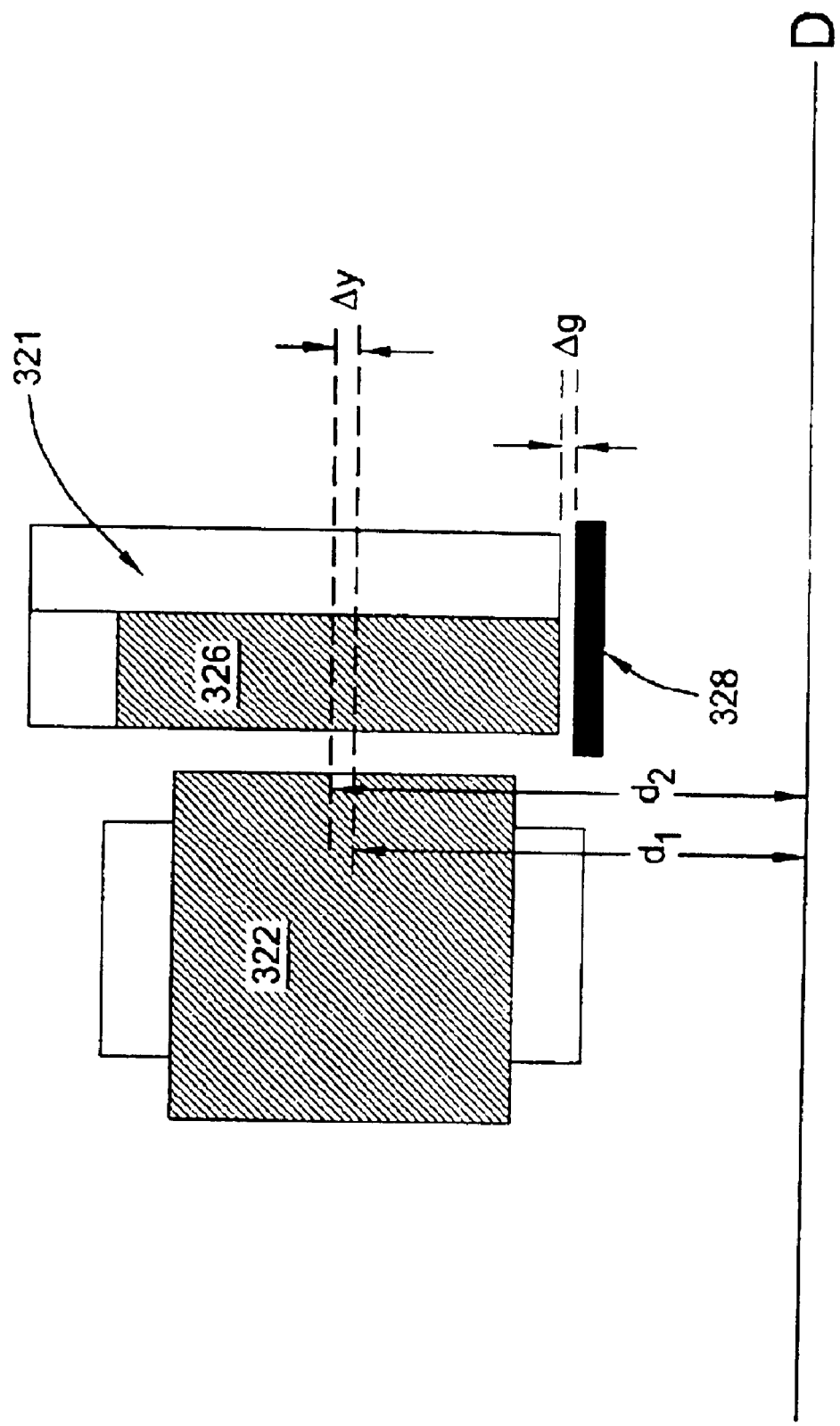
FIG. 3 is a vertical sectional view depicting the relation between the stator, magnet and steel ring according to one embodiment of the invention.

FIG. 3 illustrates in greater detail the relation between the stator 322, magnet 326, and ring 328. The stator 322 is offset axially from the magnet 326 to create a magnetic bias force. That is, the stator 322 and magnet 326 are positioned so that the axial distances from a datum D to the midpoints (i.e. half the height) of the stator 322 ($d_1$) and magnet 326 ($d_2$) are not equal; they are offset by an axial distance of $\Delta y$. The resultant magnetic bias force produces a DC component that constrains the axial movement of the motor by pulling the hub 304 down. This net downward force 330 opposes the upward force 340 produced by the rotation of the shaft 302 (See FIG. 2).

Figure 4:
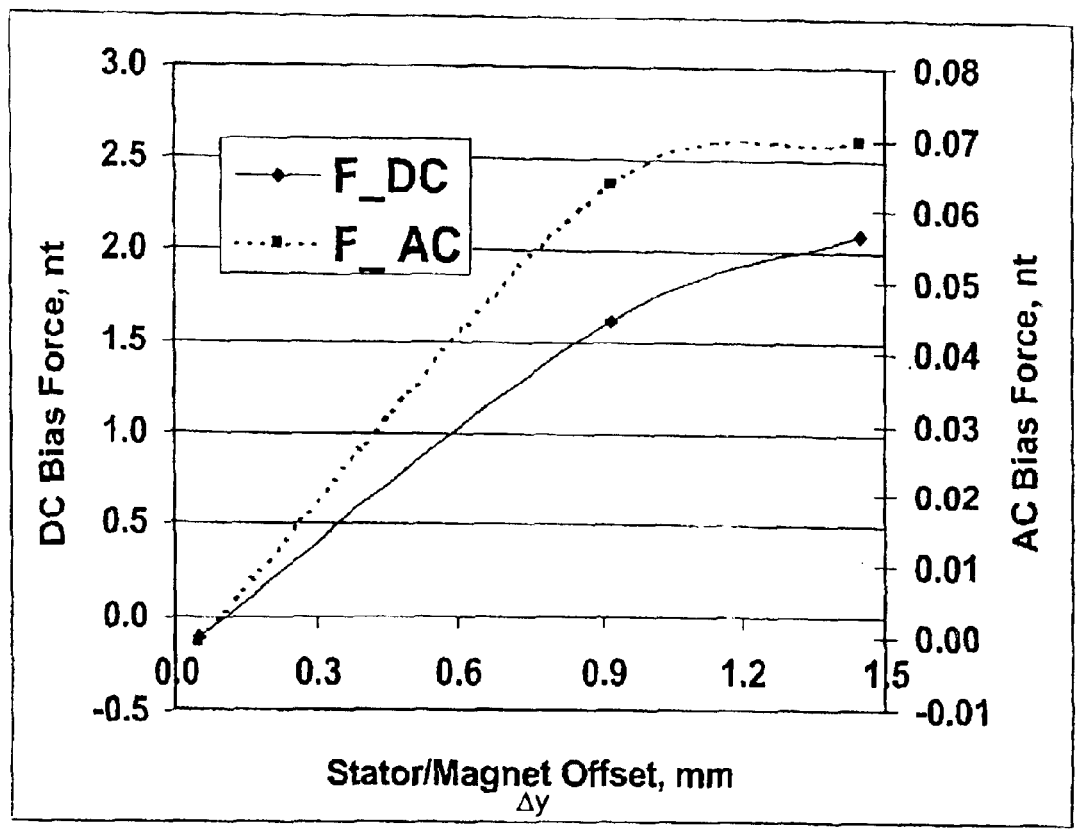
FIG. 4 is a graph illustrating the magnetic bias force and harmonics in a fluid dynamic bearing motor having a stator/magnet offset.

However, the bias force also produces an undesirable force harmonic, i.e. an AC component, which results in acoustic noise that emanates from the motor. FIG. 4 illustrates the magnitudes of the DC (i.e. magnetic bias force) and AC (i.e. force harmonics) components produced by various stator/magnet offsets $\Delta y$.

Figure 5:
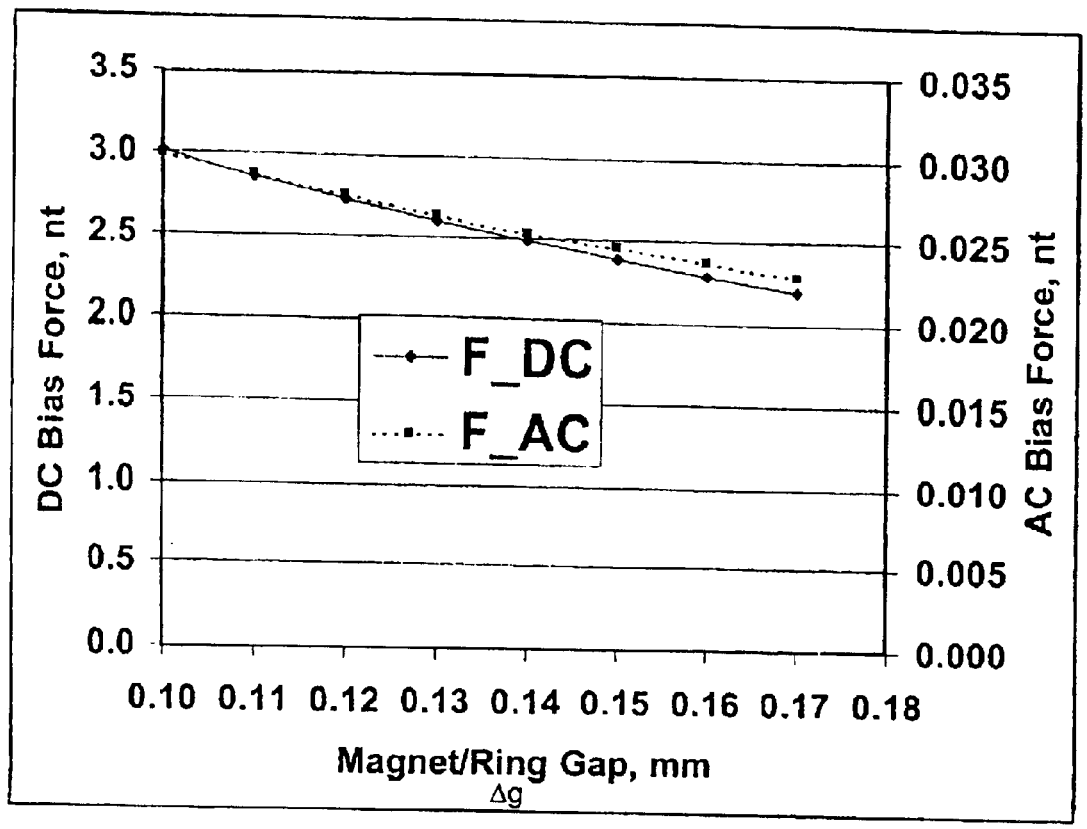
FIG. 5 is a graph illustrating the magnetic bias force and harmonics in a fluid dynamic bearing motor having a magnet and a steel ring.
Figure 6:
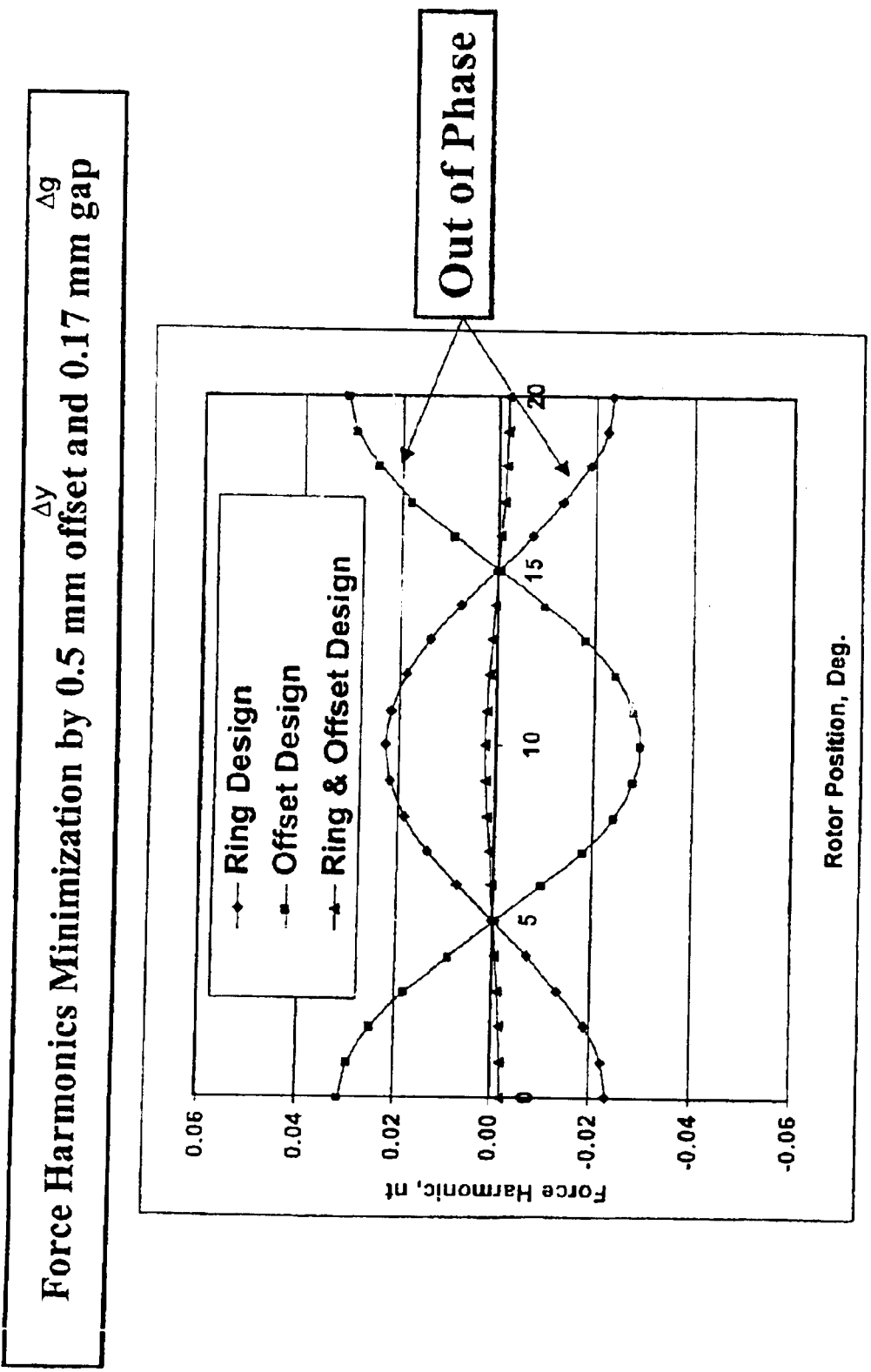
FIG. 6 is a graph illustrating the force harmonics minimization achieved by the combination of stator/magnet offset and a steel ring.

To minimize the AC component and the resultant acoustic noise, a ring 328 is placed beneath the magnet 326. The gap between the magnet 326 and ring 328 is represented by $\Delta g$. The magnet 326 and ring 328 acting together creates a magnetic bias force similar to that created by the stator/magnet offset; that is, a DC component and an AC component are produced. The magnitudes of the DC and AC components produced by various magnet/ring gaps $\Delta g$ are illustrated in FIG. 5. However, as illustrated by FIG. 6, the AC components (force harmonics) produced by the stator/magnet offset and by the magnet/ring gap are out of phase. FIG. 6 illustrates the force harmonics produced by each individually for a given $\Delta y$ of approximately 0.5 mm and a given $\Delta g$ of approximately 0.17 mm. As shown, by employing both a stator/magnet offset and a magnet/ring gap, and by setting the offset $\Delta y$ and the gap $\Delta g$ properly, the two AC components produced independently by the stator/magnet offset and magnet/ring gap will substantially cancel each other out, dramatically minimizing the net force harmonic and resultant noise.

Thus, to calibrate a motor so that noise is reduced, several steps must be taken. First, the magnetic bias force and its harmonics must be calculated for the stator/magnet offset acting alone (i.e. without a steel ring) at various offsets $\Delta y$, as in FIG. 4. Second, the magnetic bias force and its harmonics must be calculated for the magnet/ring gap acting alone (i.e. without the stator/magnet offset) at various gaps $\Delta g$, as in FIG. 5. By comparing the results obtained by these calculations, a proper offset $\Delta y$ and gap $\Delta g$ can be chosen at which enough magnetic bias force is produced with minimum force harmonics. Lastly, the magnetic bias force and its harmonics must be calculated for the chosen offset $\Delta y$ and gap $\Delta g$ working simultaneously to verify that the settings are effective. If the settings are not effective, different offsets $\Delta y$ and gaps $\Delta g$ may be chosen and tested to determine their effectiveness.

Thus the present invention represents a significant advancement in the field of fluid dynamic bearing motor design. Power consumption concerns are addressed by employing a magnetic force to maintain pressure in the fluid bearing and constrain axial movement of the hub. Undesirable harmonics produced by the magnetic force are minimized, reducing the amount of acoustic noise that emanates from the motor.

While the foregoing is directed to embodiments of the invention, other and further embodiments of the invention may be devised without departing from the basic scope thereof, and the scope thereof is determined by the claims that follow.

What is claimed is:

1. A spindle motor comprising:

a stationary sleeve supported from a base;

a rotating shaft disposed through the sleeve;

a fluid dynamic bearing between the sleeve and the shaft;

a hub supported proximate a first end of the shaft;

a stator supported from the base;

a magnet supported from the hub and offset axially relative to the stator; and a ring supported from the base and positioned beneath the magnet across a gap defined to produce force harmonics out of phase with farce harmonics generated by the magnet and stator.

2. The spindle motor of claim 1, wherein the ring comprises a magnetically permeable material.

3. The spindle motor of claim 2, wherein the ring comprises steel.

4. The spindle motor of claim 2, wherein the axial offset between the magnet and the stator is the difference between a first vertical distance from a datum to a midpoint of the magnet and a second vertical distance from said datum to a midpoint of the stator.

5. The spindle motor of claim 4, wherein the axial offset between the magnet and the stator produces both a force that axially biases the shaft and force harmonics.

6. The spindle motor of claim 5, wherein the ring is separated from a bottom surface of the magnet by a gap.

7. The spindle motor of claim 6, wherein upon rotation of the motor the magnet and the ring produce both a force that axially biases the shaft and force harmonics.

8. The spindle motor of claim 7, wherein the axial offset between the stator and magnet is set at a first value to produce a force harmonic, and the gap between the bottom surface of the magnet and the ring is set at a second value to produce a force harmonic, so that upon rotation of the motor, the two force harmonics substantially cancel each other out.

9. The spindle motor of claim 8, further comprising a counter plate supported from a second end of the shaft.

10. The spindle motor of claim 9, wherein the fluid dynamic bearing comprises:
- a fluid disposed between an outer surface of the shaft and an inner surface of the sleeve and between a bottom surface of the shaft and a top surface of the counter plate;
- grooves on at least one of the outer surface of the shaft and the inner surface of the sleeve; and
- grooves on at least one of the bottom surface of the shaft and the top surface of the counter plate.

11. A spindle motor comprising:
- means for rotating at least one disk;
- stationary means for supporting the rotating means;
- bearing means between the rotating means and the stationary support means;
- axial bias means for restricting axial movement of the rotating means relative to the stationary support means; and
- means for minimizing harmonics produced by the axial bias means.

12. The spindle motor of claim 11, wherein the bearing means comprises a fluid dynamic bearing comprising:
- a fluid between an outer surface of the rotating means and an inner surface of the stationary support means; and
- grooves on at least one of the outer surface of the rotating means and the inner surface of the stationary support means.

13. The spindle motor of claim 12, wherein the axial bias means comprises:
- a stator supported from the stationary support meals; and
- a magnet supported from the rotating means and offset axially from the stator.

14. The spindle motor of claim 13, wherein the means for minimizing harmonics produced by the axial bias means comprises a ring supported from the stationary support means and positioned beneath the magnet.

15. The spindle motor of claim 14, wherein the ring comprises a magnetically permeable material.

16. The spindle motor of claim 15, wherein the ring comprises steel.

* * * * *